No. 645,345. Patented Mar. 13, 1900.
L. A. YOUNG.
DENTAL BROACH.
(Application filed Oct. 5, 1899.)
(No Model.)
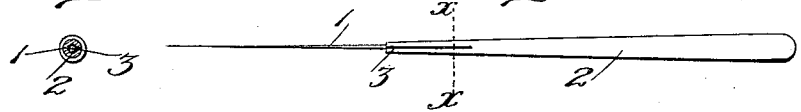
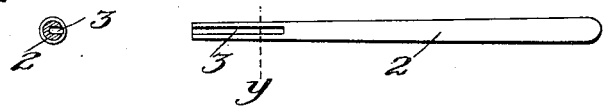

United States Patent Office.

LUTHER A. YOUNG, OF ST. LOUIS, MISSOURI.

DENTAL BROACH.

SPECIFICATION forming part of Letters Patent No. 645,345, dated March 13, 1900.

Application filed October 5, 1899. Serial No. 732,649. (No model.)

*To all whom it may concern:*

Be it known that I, LUTHER A. YOUNG, a citizen of the United States, residing at St. Louis, in the State of Missouri, have invented certain new and useful Improvements in Dental Broaches; and I do declare the following to be a full, clear, and exact description of the invention, such as will enable others skilled in the art to which it appertains to make and use the same.

The invention relates to dental broaches.

The object of the invention is to provide simple, durable, and inexpensive means for connecting the broach to a handle without the employment of foreign agencies, such as solder or mechanical fastening means.

To this end the invention consists in certain features of construction and combination of parts, which will be hereinafter fully described and claimed.

In the accompanying drawings, Figure 1 is a side elevation of a dental broach and its handle, the parts being united. Fig. 2 is a similar view of the handle before it is secured to the broach-wire. Fig. 3 is a cross-sectional view on the line X X of Fig. 1. Fig. 4 is a similar view on the line Y Y of Fig. 2. Fig. 5 is a side view of one form of broach-wire. Fig. 6 is a similar view of another form. Fig. 7 is a view of still another form. Fig. 8 is a view of another form.

In the drawings the same reference characters indicate the same parts of the invention.

1 denotes the broach-wire, and 2 its handle. The broach-wire is preferably formed of fine steel wire, although any other metal may be employed, and the handle is preferably formed of aluminium or other soft ductile metal. The handle has formed in its side at one of its ends a groove 3, which is preferably, but not necessarily, formed by stamping. The shank end of the broach-wire is roughened, either by being corrugated, as shown in Fig. 5, notched, as shown in Fig. 6, barbed, as shown in Fig. 7, or hooked, as shown in Fig. 8. The roughened end of the broach-wire is inserted into the groove formed in the handle, and by squeezing the end of the handle tightly upon the roughened end of the broach-wire said wire will be firmly clamped to the handle, thus providing a simple and inexpensive means of securing the parts together without the employment of any foreign agent.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. A broach comprising a wire, and a metal handle formed with a groove in its side at one end, said wire being inserted in said groove and clamped therein by the compression of the walls of the groove around said wire, substantially as and for the purpose set forth.

2. A broach comprising a wire roughened at one end, and a metal handle formed with a groove in its side at one end, said wire being inserted in said groove and clamped therein by the compression of the walls of the groove around said wire, substantially as and for the purpose set forth.

In testimony whereof I have hereunto set my hand in presence of two subscribing witnesses.

LUTHER A. YOUNG.

Witnesses:
TILDEN N. DAVIS,
P. J. DONNELLY.